United States Patent
Anderson et al.

(10) Patent No.: US 7,791,365 B2
(45) Date of Patent: Sep. 7, 2010

(54) REMOTELY CONFIGURABLE CHIP AND ASSOCIATED METHOD

(75) Inventors: Brent A. Anderson, Jericho, VT (US); Joseph J. Czajkowski, Carteret, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/875,137

(22) Filed: Oct. 19, 2007

(65) Prior Publication Data

US 2009/0102505 A1 Apr. 23, 2009

(51) Int. Cl.
H03K 19/00 (2006.01)
H03K 19/173 (2006.01)

(52) U.S. Cl. ............................................ 326/8; 326/38

(58) Field of Classification Search ............. 326/37–41, 326/47, 8; 705/22, 50–79
See application file for complete search history.

(56) References Cited

U.S. PATENT DOCUMENTS

| | | | |
|---|---|---|---|
| 5,175,751 A | 12/1992 | Heaney et al. | |
| 5,297,272 A | 3/1994 | Lu et al. | |
| 5,530,753 A | 6/1996 | Easter et al. | |
| 5,546,563 A | 8/1996 | Chuang | |
| 5,586,270 A | 12/1996 | Rotier et al. | |
| 5,664,225 A | 9/1997 | Ayash et al. | |
| 5,675,772 A | 10/1997 | Liu et al. | |
| 5,761,479 A | 6/1998 | Huang et al. | |
| 5,768,584 A | 6/1998 | MacDonald et al. | |
| 5,784,313 A | 7/1998 | Trimberger et al. | |
| 5,884,091 A | 3/1999 | Ghori et al. | |
| 5,983,297 A | 11/1999 | Noble et al. | |
| 6,058,478 A | 5/2000 | Davis | |
| 6,151,678 A | 11/2000 | Davis | |
| 6,289,459 B1 | 9/2001 | Fischer et al. | |
| 6,317,500 B1 | 11/2001 | Murphy | |
| 6,351,681 B1 | 2/2002 | Chih et al. | |
| 6,542,981 B1 | 4/2003 | Zaidi et al. | |
| 6,615,264 B1 | 9/2003 | Stoltz et al. | |
| 6,799,133 B2 | 9/2004 | McIntosh et al. | |
| 7,023,994 B1 | 4/2006 | Dupre | |
| 2003/0110306 A1 | 6/2003 | Baillis et al. | |
| 2003/0217306 A1 | 11/2003 | Harthcock et al. | |
| 2006/0131743 A1* | 6/2006 | Erickson et al. ............. 257/737 |
| 2007/0146005 A1* | 6/2007 | Sauber et al. ................. 326/37 |

* cited by examiner

*Primary Examiner*—Rexford N Barnie
*Assistant Examiner*—Jany Tran
(74) *Attorney, Agent, or Firm*—Wood, Herron & Evans LLP

(57) ABSTRACT

A method for configuring a chip having a plurality of on-chip configurable features. The plurality of on-chip configurable features is disabled before delivery of the chip to a new location. The chip is delivered to a new location where a unique hardware identifier and data for at least one of the on-chip configurable features is retrieved. The unique hardware identifier and the data are transmitted to an enabling entity. The enabling entity sends the enablement configuration to the chip. The chip is programmed with the enablement configuration, which enables the at least one on-chip configurable feature at the new location.

16 Claims, 5 Drawing Sheets

REMOTELY CONFIGURABLE CHIP AND ASSOCIATED METHOD

FIELD OF THE INVENTION

The present invention generally relates to methods and apparatus for electronically and securely configuring hardware features and options, and more particularly to secure configuration of hardware features and options remote from the manufacturer or other source.

BACKGROUND OF THE INVENTION

At present, it is standard for a variety of models of computers and other electronic devices to be offered, each with different capabilities and features. This is true for each type of device, from a video game, to a personal computer, to large mainframe and super computers. However, this wide variety of choices results in the requirement that each variation and model must be manufactured and kept in inventory.

High value semiconductor devices, such as processors, are being offered in increasingly granular variations. For example, clock frequency, cache size and number of processor cores is variable by stock keeping unit ("SKU"), as is the presence or absence of features such as symmetric multi-threading or accelerator engines. This increasing granularity is driven in part by computer manufacturers' desire to market a variety of computer models at multiple price points to different markets (e.g., business, consumer, and embedded), each having different needs and each being further segmented by usage, price and other intangibles. The granularity is increasing as evidenced by the increasing number of processor SKUs from leading makers, who are offering a broad portfolio of products to reduce "holes" where a competitor might gain a foothold. As semiconductor processes advance, they allow for more device features to be present, but which may or may not be enabled on a particular SKU during manufacturing, frequently based on marketing decisions. This results in a large, and increasing number of SKUs for these devices. The increased SKUs create complexity and inventory management problems for both the manufacturer and high volume customers.

In addition, because semiconductor devices are high value, small in size and easily re-sold, they are a target for theft and pilferage. The risk of theft of computer chips, especially processors, is a concern of the chip manufacturer as the size of the chips and current street value make them an attractive target. Additionally, the chip manufacturer typically ships the chips to third party manufacturers who use the chips in their products. Shipment to the manufacturer and storage at the manufacturer's location provide two opportunities for theft to occur.

In particular, it is common for a specific computer to be offered in several variations, using different processors, each with different features present, to create a variety of computer models at several price points to address market needs. As discussed above, at present, each configuration of a module or chip assembly is manufactured and must be stocked in inventory to meet the demands of customers who desire the option of variations in functional characteristics or capabilities of a computer system. It is apparent, however, that computer manufacturers would realize large efficiencies and economics by reducing the number of model variants manufactured.

In addition, a computer, or even a high-end video game, is generally sold with a particular configuration that meets the current needs of a user. The system can usually be upgraded, modified or repaired as needed to meet the increasing needs of the users. At present, it is common for a new hardware unit to be added to the system to upgrade the hardware features or options. Often, a new or additional multi-chip module must be installed. The installation of the new hardware often must be performed off-site and so the user must do without the system while the appropriate hardware is added or removed. In other instances, the configuration can be done on site but requires extensive configuration of the hardware. The user suffers from the loss of the use of the system and, in some cases the loss of use results in financial loss and usually causes an interruption in the user's business. Furthermore, similar problems result from failures in hardware elements.

SUMMARY OF THE INVENTION

Embodiments of the invention addresses these and other problems in the prior art by providing a chip that includes a plurality of on-chip configurable features. The on-chip configurable features each have a disabled state and an enabled state. Initially, the on-chip configurable features are set to the disabled state. At least one of the on-chip configurable features is operable to change from the disabled state to the enabled state upon receipt of a valid enablement configuration from an enabling entity.

The chip, in some specific embodiments, includes a nonvolatile memory operable to store the enablement configuration. At least one of the on-chip configurable features may be enabled to provide minimal operation of the chip for testing. The on-chip configurable features include, but are not limited to, features such as cache memory size, clock speed, I/O speed, power saving operation, special co-processor capabilities, processor cores, security, backup, communication, and combinations thereof.

An embodiment of the invention additionally provides a method for configuring the chip having the plurality of on-chip configurable features. The configurable features are disabled before delivery to a new location. The chip is then delivered to a new location, where a unique hardware identifier and data for at least one of the on-chip configurable features is retrieved and transmitted to an enabling entity. An enablement configuration is received from the enabling entity and the chip is programmed with the enablement configuration to enable at least one of the on-chip configurable features at the new location. In certain specific embodiments, the unique hardware identifier and the data are electronically sent by various methods including sending via email, sending over a network, sending over a phone line, or sending via wireless communications. The enablement configuration received, in some specific embodiments, may be stored in nonvolatile memory on the chip. The enablement configuration is validated and, in response to an invalid enablement configuration, the chip is disabled. Minimal operation of the chip may be provided before receiving the enablement configuration to provide for testing of the chip.

An embodiment of the invention further provides a method of upgrading a computer having a chip with a plurality of on-chip configurable features and a unique hardware identifier. A first on-chip configurable feature in the computer is enabled by an enabling entity before delivery. The computer is delivered to an end user. The end user transmits the unique hardware identifier of the chip and data associated with at least a second on-chip configurable feature that is disabled to the enabling entity. An enablement configuration is received from the enabling entity and validated. In response to a valid enablement configuration, the second on-chip configurable feature is enabled. In some specific embodiments, the end user may transmit the unique hardware identifier of the chip and data associated with an on-chip configurable feature that is enabled to the enabling entity in order to disable the configurable feature. An enablement configuration is received from the enabling entity and validated. In response to a valid enablement configuration, the configurable feature on the chip is disabled.

BRIEF DESCRIPTION OF THE DRAWINGS

The accompanying drawings, which are incorporated in and constitute a part of this specification, illustrate embodiments of the invention and, together with a general description of embodiments of the invention given above, and the detailed description given below, serve to explain the principles of the embodiments of the invention.

DETAILED DESCRIPTION

Chips having a plurality of configurable features that can be enabled or disabled provide flexibility to a manufacturer of, for example, computer chips, as the same hardware may be used for multiple applications depending on the final endpoint configuration. Instead of the manufacturer having to produce multiple configurations of a particular chip, a single configurable chip may be used in each of the applications. This may be advantageous for the manufacture for a number of reasons. Manufacturers and their customers would see the value of reduced inventory management and simpler mix management. For example, the manufacturer may be able to lower production costs as they would not have to produce and store multiple configurations of computer chips. Chips produced with defects that affect only a few of the configurable features may still be utilized for the features unaffected by the defect, reducing waste. Chips may also be stored and shipped in a disabled configuration, reducing the temptation and value to would-be thieves, reducing losses and reducing the costs to secure them from theft and pilferage. The term computer chip as used throughout this application refers to not only the traditional computer chip such as a processor or microprocessor, memory chip, or graphic chip, but also to any type of integrated circuit that contains multiple features, which could be enabled or disabled, and is produced in a modular form to be used in electronic applications.

Figure 1:
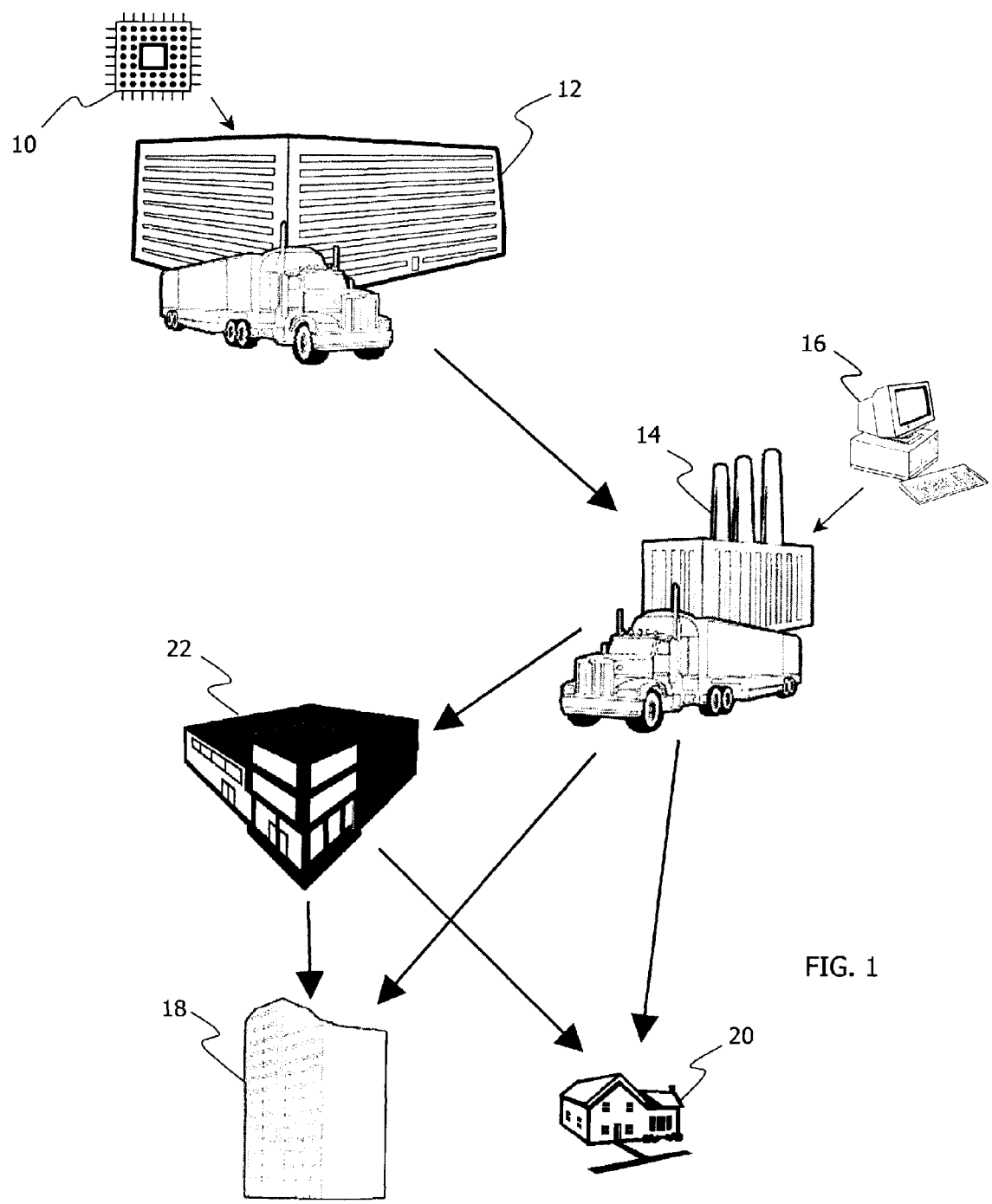
FIG. 1 illustrates a sequence of events for a computer chip from manufacture to end user.

Referring now to FIG. 1, generally, a computer chip 10, such as a processor, is created by a chip manufacturer for use in computer applications. For purposes of this application, the term computer may represent practically any computer, computer system, or programmable device e.g., multi-user or single-user computers, desktop computers, portable computers and devices, handheld devices, network devices, mobile phones, etc. The computer chip 10 is produced and tested by the manufacturer at a production facility 12 where it is stored based on its configuration and awaits shipment to a specific third party manufacturer to be used in a third party product, such as a computer. The chip is shipped to the third party facility 14 where the chips are assembled with other components into the third party product 16 and again tested in the third party product 16. The third party product 16 may then be sold and shipped to commercial customers 18, residential customers 20, or retailers 22, who may resell the third party products 16 to commercial customers 18 or residential customers 20.

As discussed above, chip manufacturers, who supply to multiple third parties with varying applications must produce variants of the computer chips to meet the needs of each of the third party manufacturers to produce a number of product models at various feature and price points. Using a computer chip with configurable features, consistent with embodiments of the invention, would allow the chip manufacturer to reduce the number of variations of a particular chip and tailor the configurable chip by enabling and disabling the configurable features.

Figure 2:
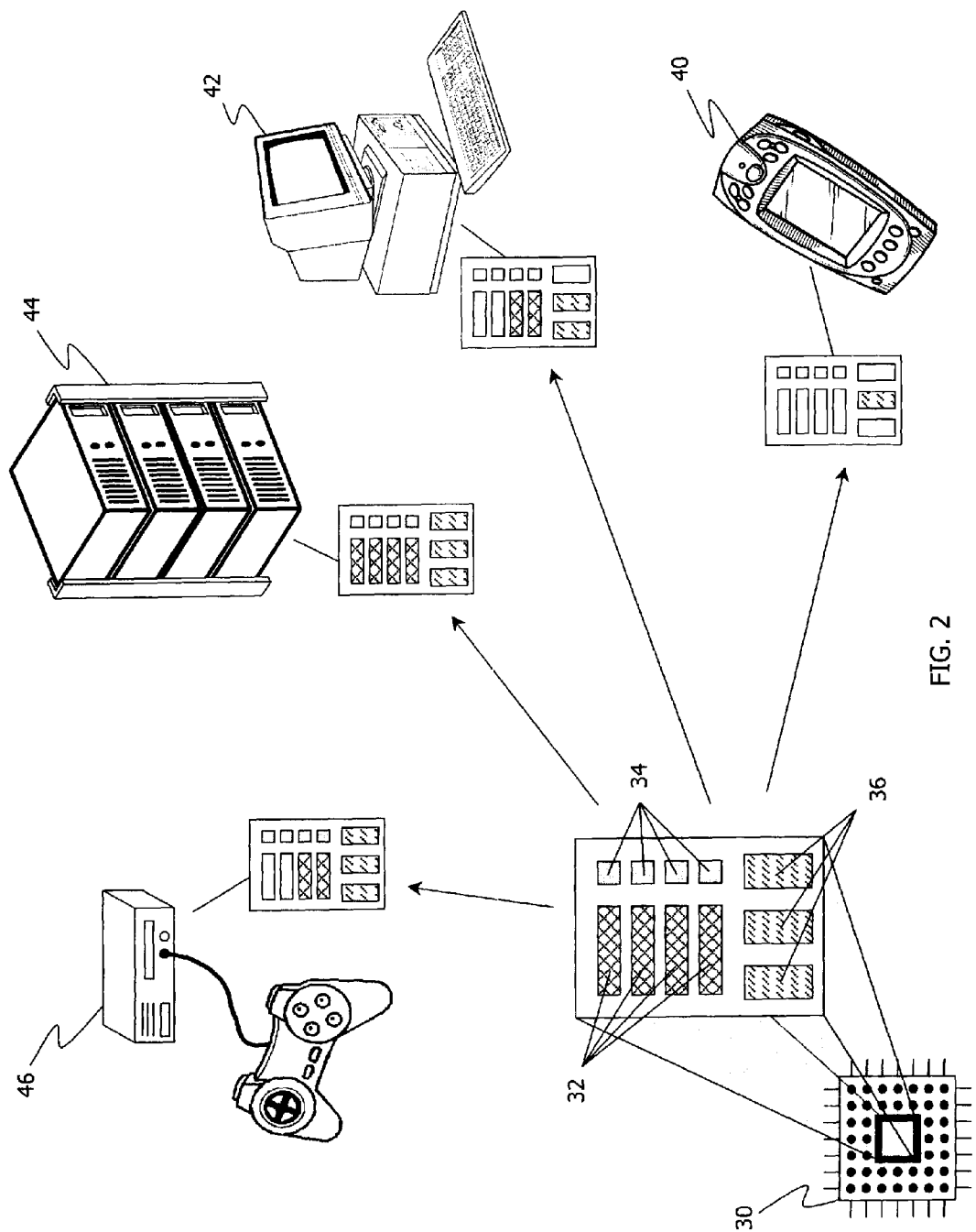
FIG. 2 shows a computer chip with configurable features being configured and utilized in several different applications.

For example, and with reference to FIG. 2, a computer chip 30 contains configurable features 32, 34, and 36, including but not limited to cache memory size, clock speed, I/O speed, power saving operations, special co-processor capabilities, processor cores, security, backup, or communication. Computer chip 30 may be used in a variety of applications, such as a personal data assistant or PDA 40, a low end home computer 42, a high end computer or computer cluster 44, or a mid to high end video game 46. As can be seen in the example in FIG. 2, each of the third party products, 40, 42, 44, or 46, uses the computer chip 30 with different subsets of the configurable features 32-36 enabled or disabled.

Additional advantages of using the single computer chip for multiple applications may also be realized, for example, for the user of the low-end computer 42. Traditionally, the end user of computer 42 who wanted to upgrade his or her machine to contain higher end functionality, would need to be savvy enough to disassemble the computer and replace the original components with new, upgraded components. Alternatively, the end user of computer 42 would need to take the computer 42 to an expert to have someone else perform the upgrade, thereby losing the use of the computer 42 while it is being upgraded. In some cases, an upgrade is not possible without replacing the computer itself (e.g., the computer chip is soldered in place and is not removable). The computer chip 30 with configurable features provides the ability of the computer chip to be upgraded, thereby upgrading computer 42, by enabling additional features, without having to replace hardware. Additionally, configurable features on the computer chip 30 may also be disabled if the feature is no longer wanted by the end user.

Figure 3:
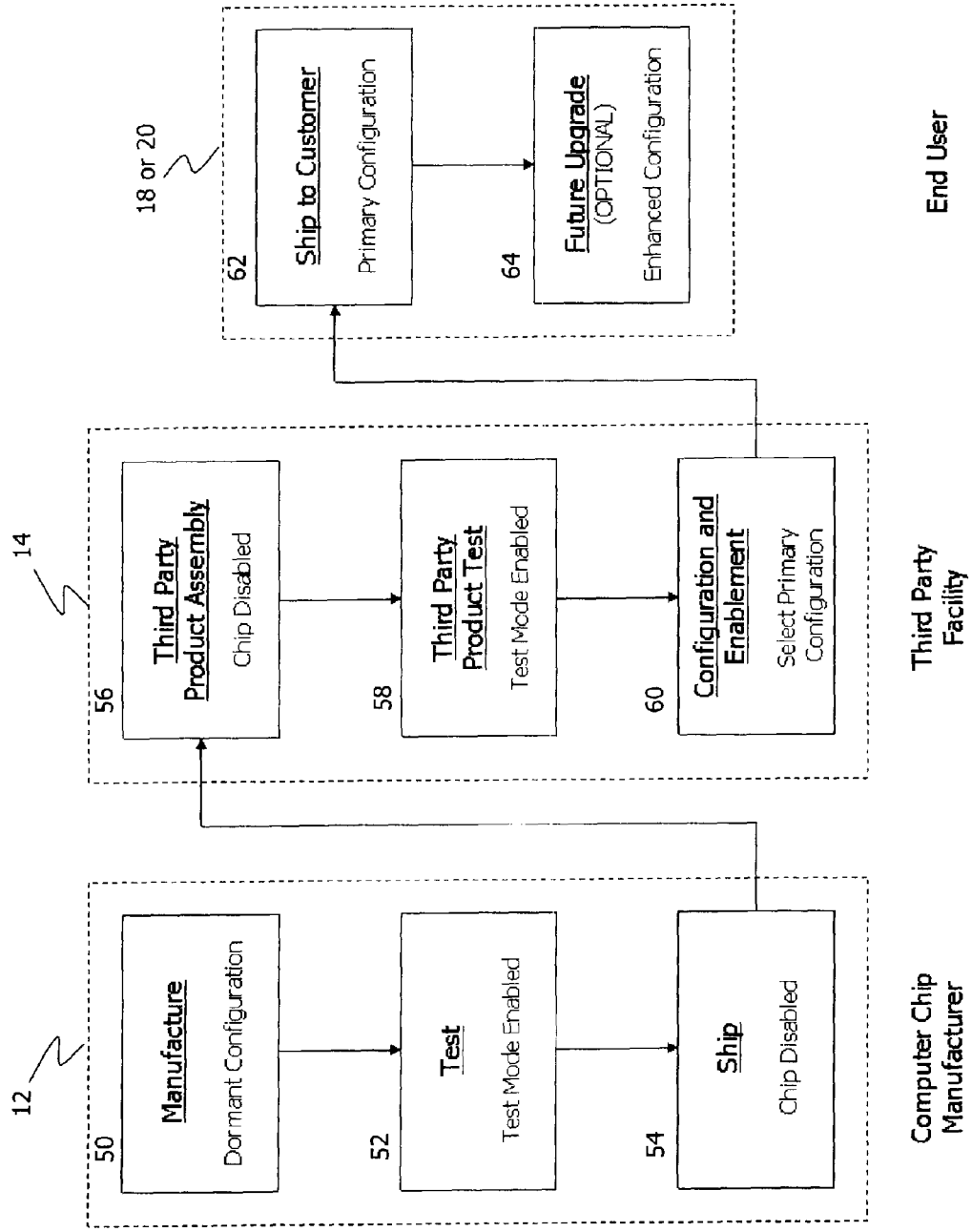
FIG. 3 is a block diagram representing the sequence of events in FIG. 1 as applied to the computer chip with configurable features in FIG. 2.

The sequence of events for the computer chip 30 with configurable features 32-36 is similar to that described above. Referring to the block diagram in FIG. 3, the chip manufacturer 12 manufactures the computer chip 30 with the configurable features 32-36 in a dormant configuration in block 50. After manufacture, at least a portion of the configurable features 32-36 are enabled placing the computer chip 30 in a test mode or a minimal operation mode suitable for testing in block 52. After the tests are completed, the manufacturer disables the configurable features 32-36 on the computer chip 30 and packages chip 30 for shipment in block 54.

Shipping the computer chip 30 in a disabled state, as discussed above, reduces the value of the chip 30 and the likelihood of theft. After the computer chip 30 arrives at the third party facility 14, it is assembled into a third party product, such as the PDA 40, computers 42, 44, or video game 46 shown in FIG. 2. The configurable features 32-36 of the computer chip 30 may still be in a disabled state, or in other embodiments, the configurable features 32-36 may be set to a minimal test configuration mode prior to assembly in block 56. Once in the minimal test configuration mode, in block 58, the third party product may be put through an appropriate testing regimen to ensure that all of the components are working together. At this point, the computer chip 30 is configured, in block 60, by enabling at least a subset of the configurable features 32-36 to meet the desired functionality of the third party product, and ultimately the end user.

Once the computer chip 30 has been configured, the third party product is ready to ship to a retailer 22 or to an end user, such as a commercial customer 18 or residential customer 20. The third party product containing the computer chip 30 is shipped with the configurable features 32-36 enabled on the computer chip 30 in the primary configuration in block 62. Once in the possession of the end user or customer, the third party product may be used for its intended purpose. If, later on, the end user would like to upgrade the third party product, he or she may do so by enabling additional configurable features 32-36 on computer chip 30, in block 64 through a transaction with the manufacturer.

Individually configuring the computer chip in this fashion just prior to shipment, rather than at the manufacturer, allows the third party manufacturer to use the same type of computer chip in many applications, thus reducing cost and storage concerns similar to the chip manufacturer. The additional security of the disabled computer chip 30 may also be extended to the third party manufacturer when shipping to a retailer, where the applications from the third party manufacturer are shipped in a disabled state and configured at the retailer.

Figure 4:
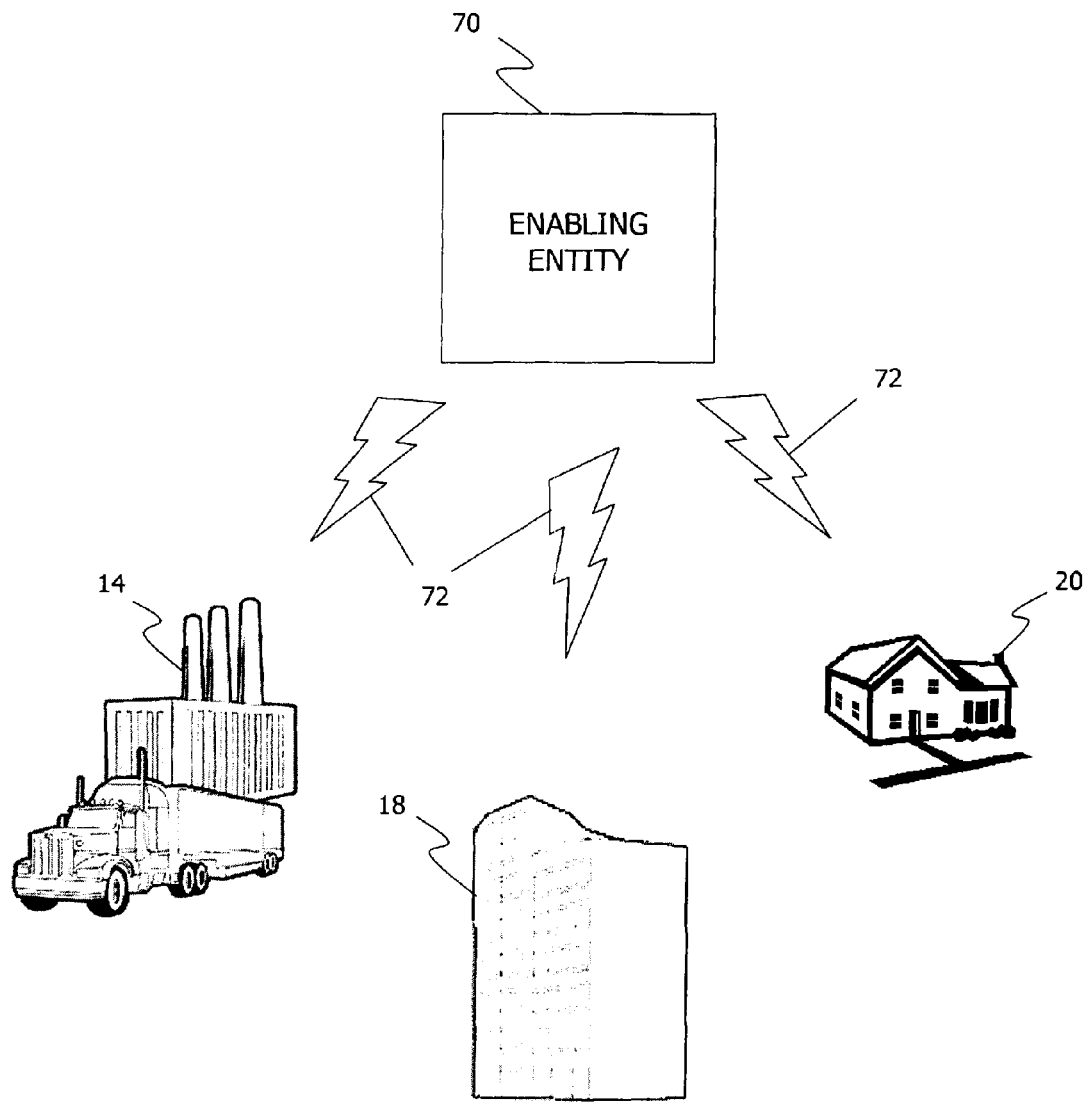
FIG. 4 is a block diagram illustrating a process to enable the configurable features on the computer chip in FIGS. 2 and 3.

To configure the computer chip 30, the third party manufacturer 14, commercial customer 18, or residential customer 20 may contact the manufacturer. In other embodiments, such as the embodiment illustrated in FIG. 4, the third party manufacturer 14, commercial customer 18, or residential customer 20, may contact an enabling entity 70, which may be a manufacturer or another party. During the manufacturing of the computer chip 30, a unique hardware identifier is written to each chip 30. This unique hardware identifier, in some embodiments, may be logged with information related to the configurable features 32-36 on the computer chip 30. The logged information may then be provided to the enabling entity 70 for use in generating enablement configurations, which enable at least a subset of the configurable features 32-36 on the computer chip 30.

The third party manufacturer 14, commercial customer 18, or residential customer 20 may gather information related to the required functionality of the computer chip 30 as well as the unique hardware identifier of the chip 30 and communicate the information in a transmission 72 to the enabling entity. The transmission 72 to the enabling entity may be an electronic communication such as sending an e-mail, sending the communication over a network, sending the communication over a phone line, or sending the transmission using wireless communications. In some embodiments, the transmission may be a secure transmission. The enabling entity receives the configuration request with the unique hardware identifier and generates an enablement configuration, specific to the computer chip 30. Individualized enablement configurations may assist in preventing unauthorized configurations of computer chips by an individual who acquires an enablement configuration. The enabling entity then returns the enablement configuration to the third party manufacturer 14, commercial customer 18, or residential customer 20 to use to enable the configurable features 32-26 on the computer chip 30. The computer chip 30, in some embodiments, may contain an on-chip nonvolatile memory that can be utilized for storing the configuration information. Attempts to use an invalid enablement configuration or an enablement configuration for another chip may cause the computer chip 30 to disable all of the configurable features 32-36, thereby rendering the chip 30 useless.

Figure 5:
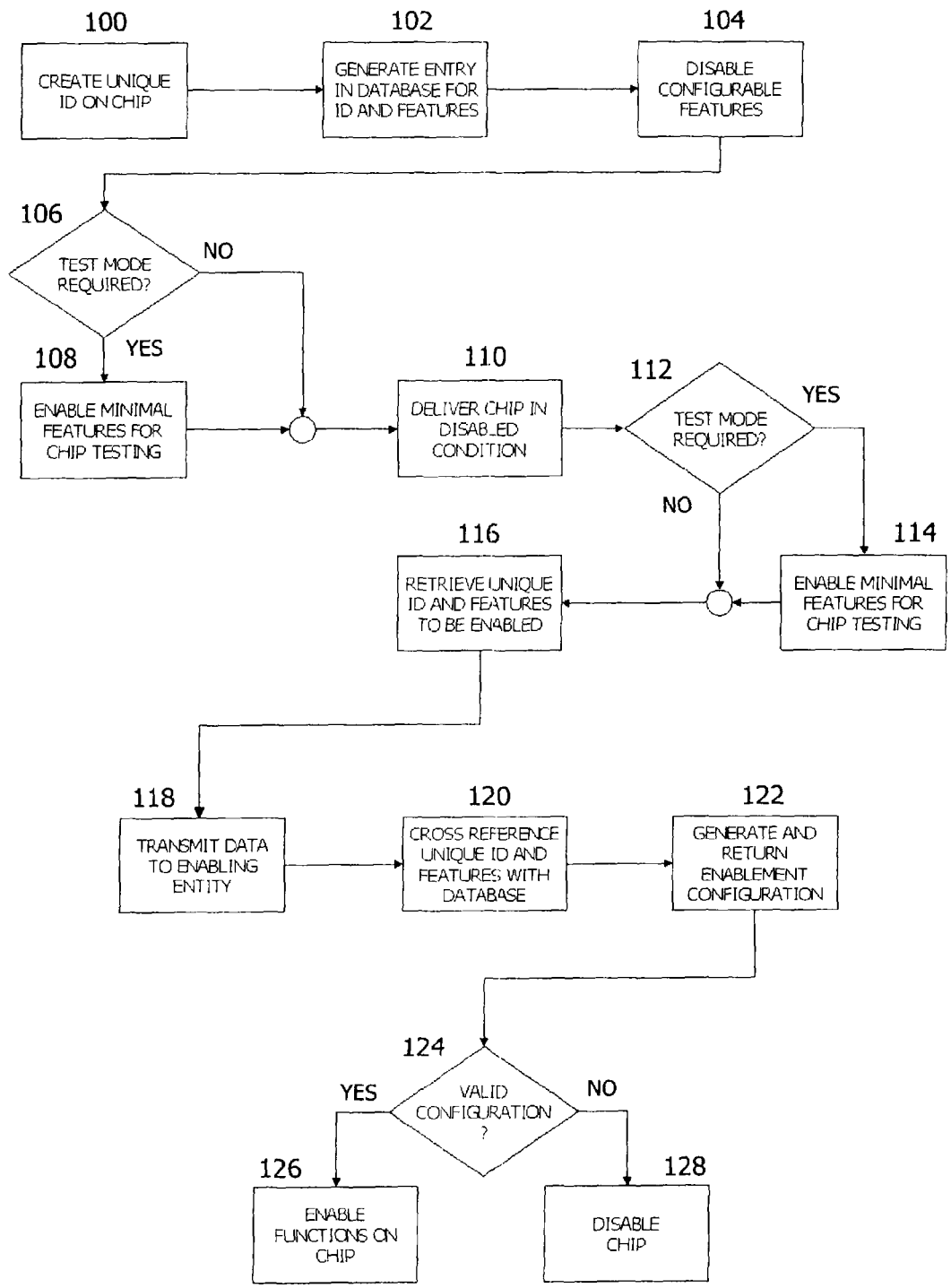
FIG. 5 is a flowchart illustrating a method for enabling features on the computer chip in FIGS. 2-4.

FIG. 5 illustrates an associated method used in configuring the features 32-36 on the computer chip 30. Initially, as discussed above, a unique hardware identifier is created on the chip 30 in block 100. An entry is generated for the chip 30 containing the unique hardware identifier and configurable features. In some embodiments, this information may be stored in a database as indicated in block 102. The configurable features of the computer chip 30 are then disabled in block 104 so that the chip 30 may be stored until needed or tested. If testing is required for the chip, ("yes" branch of decision block 106), minimal functionality, which may include the processor speed of certain operations or the duration of the operation and/or command sequence, to facilitate testing are set and the tests are performed in block 108. After testing, the features are again disabled for storage until shipment.

The computer chip 30 is delivered in a disabled condition in block 110 to a third party manufacturer. In alternate embodiments, the computer chip 30 may be sold directly to an end user, or may be assembled with additional hardware at the computer chip manufacturing facility 12. Once the computer chip 30 is assembled with other components at the third party manufacturer, additional system testing may be necessary. If testing is required ("yes" branch of decision block 112), then again a minimal configuration of features is temporarily enabled on the chip 30 for testing purposes in block 114. After the completion of the tests, the chip 30 may again be disabled.

The third party manufacturer or the end user may then retrieve the unique hardware identifier and features of the computer chip 30 to be enabled in block 116. This information is transmitted to the enabling entity in block 118 as discussed above. The enabling entity then cross-references the unique hardware identifier and requested features with the database in block 120. At this point, in some embodiments, the enabling entity may charge the third party manufacturer or the end user for the modification to the configurable features 32-36 on the computer chip 30. The enabling entity then generates an enablement configuration and returns it to the third party manufacturer or the end user in block 122. In some embodiments, the enabling entity may return the enablement configuration directly to the computer chip 30. The computer chip 30 then determines if the enablement configuration is valid in decision block 124. If the enablement configuration is valid ("yes" branch of decision block 124), then at least a subset of features 32-36 on the computer chip 30 corresponding to the enablement configuration are enabled in block 126. If, however, the enablement configuration is not valid ("no" branch of decision block 124), then all of the features on the computer chip 30 may be disabled in block 128. In some embodiments, the computer chip 30 may allow multiple attempts at entering a valid enablement configuration before it disables the chip 30. Once a chip 30 is disabled, it will not be able to be used by other applications. Some embodiments may allow reviving features on the computer chip 30 after the chip 30 has been disabled due to an invalid enablement configuration.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the configuration transaction may include customer billing for the features that are enabled. Moreover, at the point of configuration/enablement, the essentially worthless computer chip is given value as its features are enabled for which an invoice may be generated and the customer/end user is billed for the computer chip and its features at that moment. The actual value of the product is determined at the time of use, not before as with conventional computer chips and systems. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A method for configuring a chip having a plurality of on-chip configurable features, the method comprising:
   disabling the on-chip configurable features;
   delivering the chip to a new location with the on-chip configurable features disabled;
   retrieving a unique hardware identifier of the chip and data for at least one of the on-chip configurable features;
   transmitting the unique hardware identifier and the data to an enabling entity;
   in response to the transmission of the unique hardware identifier and the data to the enabling entity, receiving an enablement configuration from the enabling entity; and
   programming the chip at the new location with the enablement configuration to enable the at least one of the on-chip configurable features that was disabled when delivered.

2. The method of claim 1 wherein the chip further has a nonvolatile memory, and the method further comprises:
   storing the enablement configuration in the nonvolatile memory.

3. The method of claim 1 further comprising:
   validating the enablement configuration based upon the unique hardware identifier and the data; and
   disabling the chip if the enablement configuration received from the enabling entity is invalid.

4. The method of claim 1 further comprising:
   providing minimal operation of the chip before receiving the enablement configuration to provide for testing of the chip.

5. The method of claim 1 wherein the new location is a location of an end user of the chip.

6. The method of claim 1 wherein the new location is a location of a third party manufacturer.

7. The method of claim 1 wherein transmitting the unique hardware identifier and the data further comprises:
   electronically communicating the unique hardware identifier and the data to the enabling entity.

8. The method of claim 7 wherein electronically communicating the unique hardware identifier and the data includes sending via email, sending over a network, sending over a phone line, sending via wireless communications, or combinations thereof.

9. A method for configuring a chip with a plurality of on-chip configurable features and a unique hardware identifier, the method comprising:
   transmitting the unique hardware identifier of the chip and data associated with at least one of the on-chip configurable features that is in a disabled state to an enabling entity;
   in response to the transmission of the unique hardware identifier and the data to the enabling entity, receiving an enablement configuration from the enabling entity;
   validating the enablement configuration; and
   changing the at least one of the on-chip configurable features from the disabled state to an enabled state if the enablement configuration is valid.

10. The method of claim 9 further comprising, at the enabling entity:
    generating an invoice for the configurable features enabled in the enablement configuration.

11. A method of upgrading a computer having a chip with a plurality of on-chip configurable features and a unique hardware identifier, the method comprising:
    transmitting by the end user the unique hardware identifier of the chip and data associated with a first on-chip configurable feature that is in a disabled state to the enabling entity;
    in response to the transmission of the unique hardware identifier and the data by the end user to the enabling entity, receiving an enablement configuration from the enabling entity;
    validating the enablement configuration; and
    enabling the first on-chip configurable feature if the enablement configuration is valid.

12. The method of claim 11 further comprising:
    transmitting by the end user the unique hardware identifier of the chip and data associated with a second on-chip configurable feature of the plurality of on-chip configurable features that is in an enabled state to the enabling entity in order to disable the second on-chip configurable feature;
    receiving an enablement configuration from the enabling entity;
    validating the enablement configuration; and
    disabling the second on-chip configurable feature if the enablement configuration is valid.

13. The method of claim 11 wherein the chip further has a nonvolatile memory, the method further comprising:
    storing the enablement configuration in the nonvolatile memory.

14. The method of claim 11 further comprising:
    in response to an invalid enablement configuration, disabling the chip.

15. The method of claim 11 wherein transmitting the unique hardware identifier and the data comprises:
    electronically sending the unique hardware identifier and the data.

16. The method of claim 15 wherein electronically sending includes sending via email, sending over a network, sending over a phone line, sending via wireless communications, or combinations thereof.

* * * * *